United States Patent
Piascik et al.

(10) Patent No.: US 6,196,070 B1
(45) Date of Patent: Mar. 6, 2001

(54) FLOW SENSOR WITH WIDE DYNAMIC RANGE

(75) Inventors: James Piascik, Randolph; Reza Oboodi, Morris Plains; Devlin M. Gualtieri, Ledgewood, all of NJ (US)

(73) Assignee: AlliedSignal Inc., Morristown, NJ (US)

(*) Notice: Subject to any disclaimer, the term of this patent is extended or adjusted under 35 U.S.C. 154(b) by 0 days.

(21) Appl. No.: 09/172,447

(22) Filed: Oct. 14, 1998

(51) Int. Cl.$^7$ .................................................. G01F 1/28
(52) U.S. Cl. ..................... 73/861.74; 73/861.53; 73/861.56
(58) Field of Search ................. 73/861.71, 861.74, 73/861.75, 861.52, 861.53, 861.56, 861.82

(56) References Cited

U.S. PATENT DOCUMENTS

| | | | |
|---|---|---|---|
| 2,116,911 | 5/1938 | Richardson | 110/69 |
| 2,600,309 | 6/1952 | MacDonald et al. | 200/81.9 |
| 3,147,620 | 9/1964 | Stapler | 73/228 |
| 3,380,202 | 4/1968 | Hartinger | 51/364 |
| 3,914,994 | 10/1975 | Banner | 73/118 |
| 4,344,331 | 8/1982 | Iwasaki | 73/861 |
| 4,405,882 | 9/1983 | Reinsch | 315/118 |
| 4,526,042 | 7/1985 | Yamazoe et al. | 75/861 |
| 4,614,122 | 9/1986 | Graves | 73/861 |
| 4,625,565 * | 12/1986 | Wada et al. | 73/861.74 |
| 4,630,487 | 12/1986 | Biermann et al. | 73/861 |
| 4,688,433 * | 8/1987 | Silverwater | 73/861.53 |
| 4,777,830 | 10/1988 | Lew | 73/861 |
| 4,794,048 | 12/1988 | Oboodi et al. | 428/432 |
| 4,848,926 * | 7/1989 | Jenkins | 73/861.74 |
| 5,033,312 * | 7/1991 | Stupecky | 73/861.53 |
| 5,038,621 * | 8/1991 | Stupecky | 73/861.53 |
| 5,233,867 | 8/1993 | Richardson et al. | 73/186 |
| 5,383,470 | 1/1995 | Kolbly | 128/725 |
| 5,979,247 * | 11/1999 | Kizawa | 73/861.53 |

FOREIGN PATENT DOCUMENTS

| | | | |
|---|---|---|---|
| 0 301 534 | 1/1989 | (EP) | G01F/1/28 |
| 909 013 | 10/1962 | (GB) . | |
| 1 252 433 | 11/1971 | (GB) . | |
| WO 95/30129 | 11/1995 | (WO) | G01F/1/28 |

OTHER PUBLICATIONS

W. Göpel, J. Hesse, J.N. Zernel: Sensors, vol. 7, pp. 81–82, VCH Weinheim, 1994.

* cited by examiner

Primary Examiner—Harshad Patel
(74) Attorney, Agent, or Firm—Larry J. Palguta

(57) ABSTRACT

An improved fluid flow measuring device having more nearly linear response characteristics over a wide range of fluid flow rates measures the force exerted on a fluid flow sensing element (21, 37, 41, 47, 55, 61) located in the fluid flow. The effective area of the sensing element subjected to the fluid force decreases as the flow rate increases and increases as the flow rate decreases thereby compensating for the nonlinear relationship between fluid flow rate and the force exerted thereby. The sensing element may retract somewhat into a calm or minimal flow region (27, 35) in response to increased flow rate. The sensing element may include resilient vanes (45, 51, 52, 53, 57, 59) which bend thereby reducing their effective area in response to increased flow. The sensing element may include one or more flow passing apertures (43, 49) the size of which varies with flow rate.

12 Claims, 4 Drawing Sheets

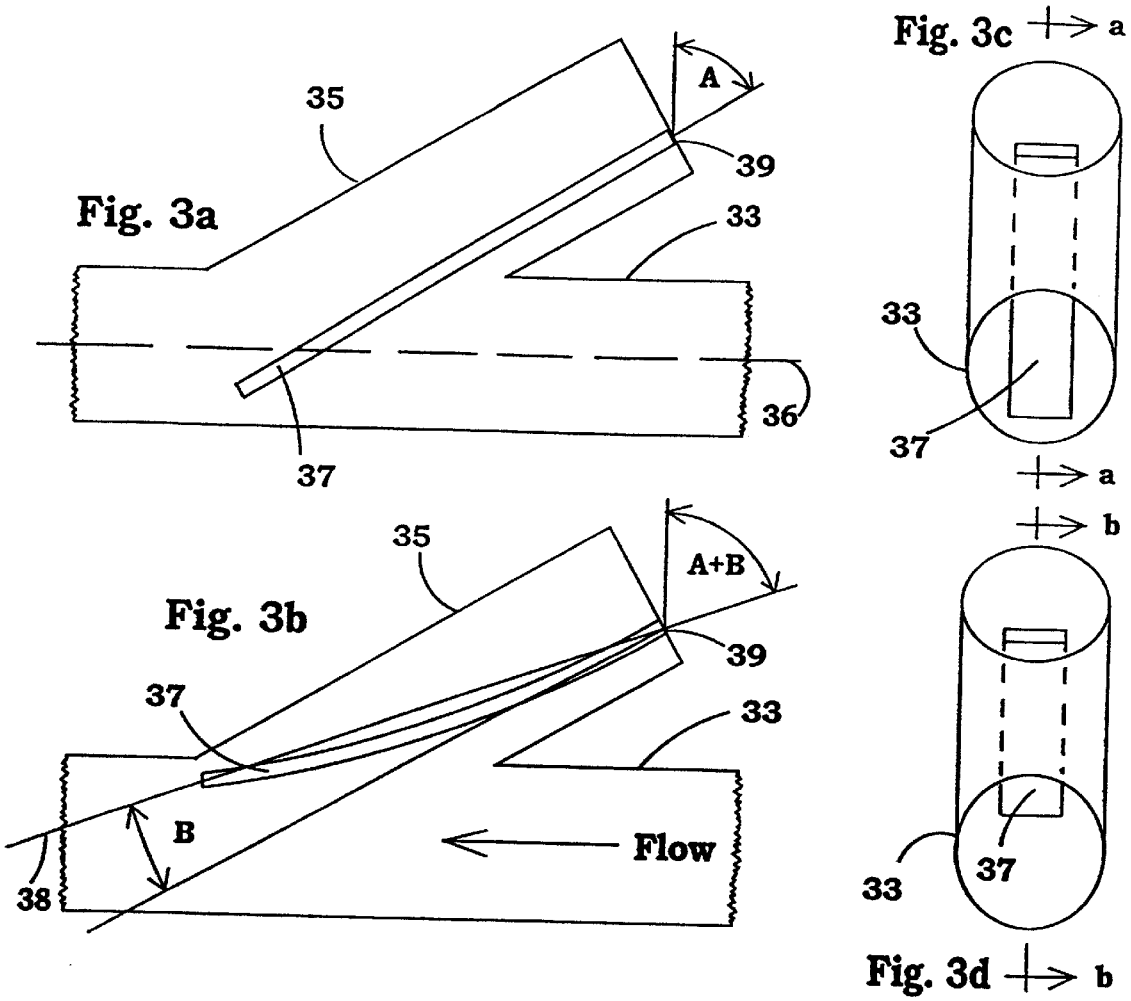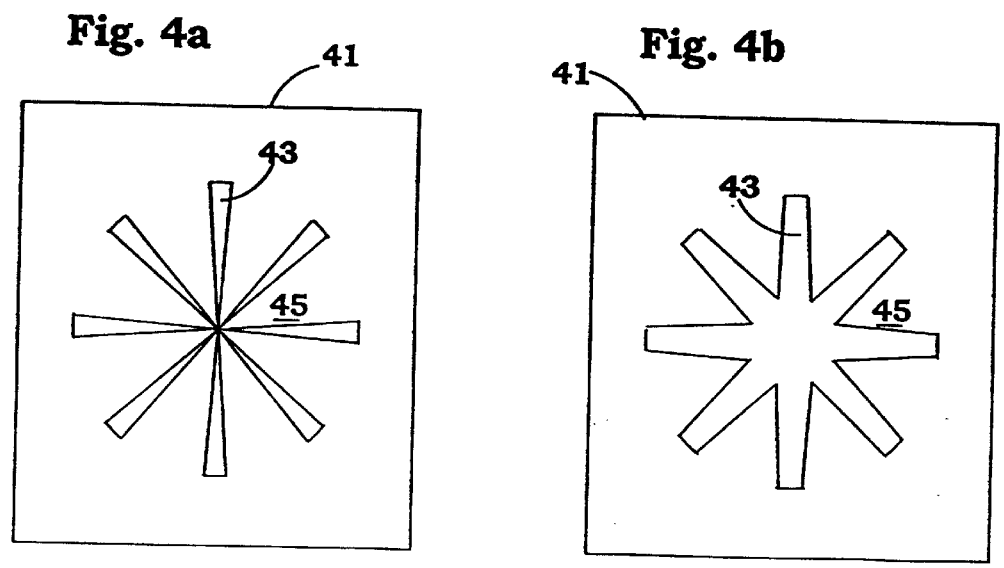

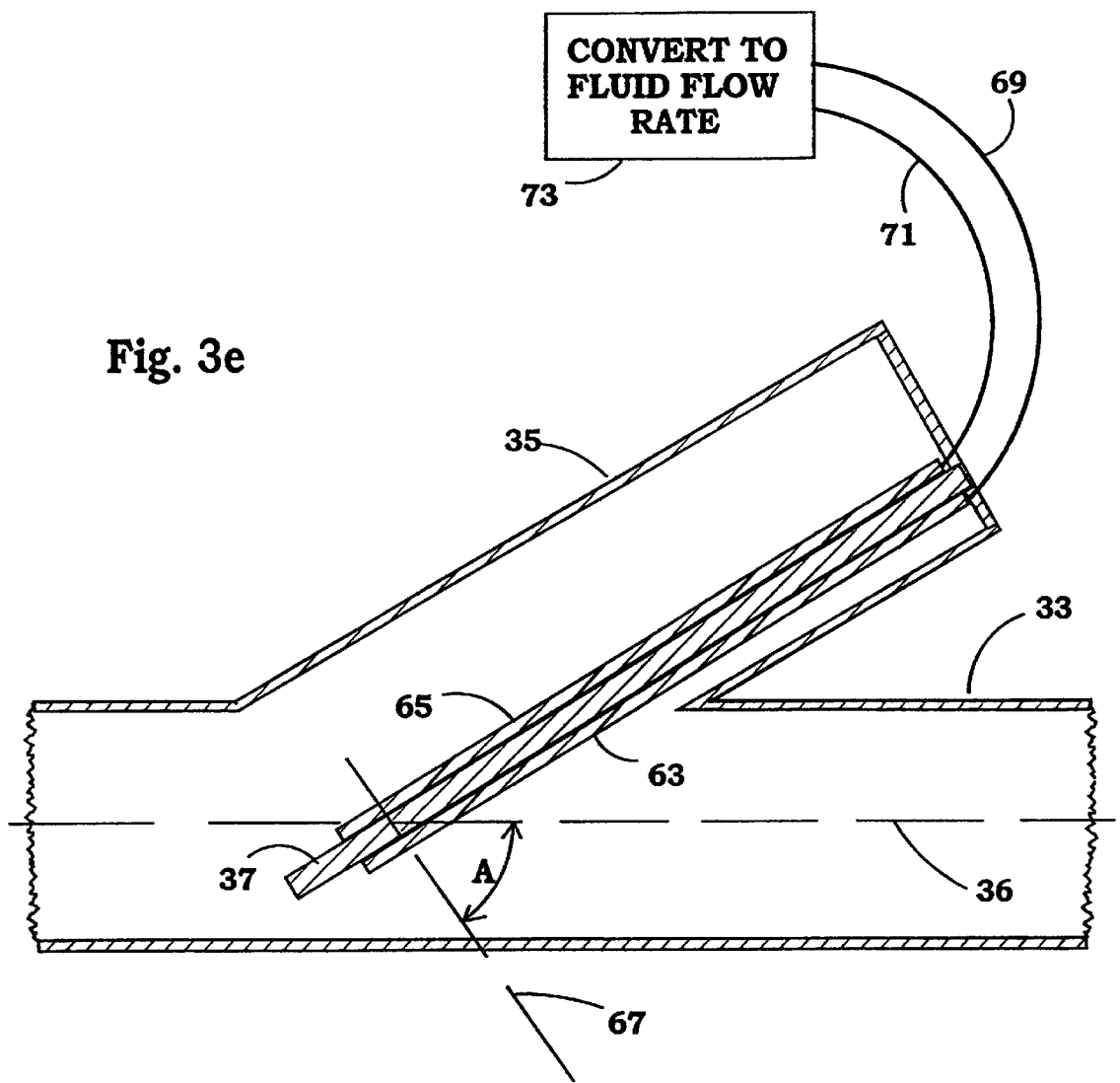

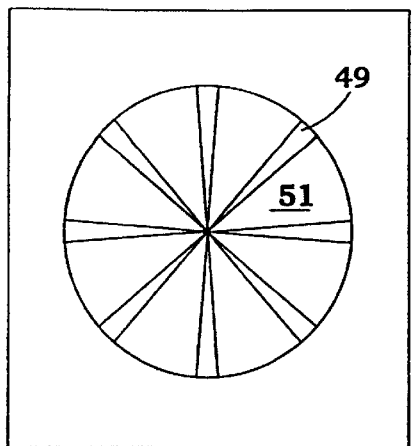
Fig. 5a
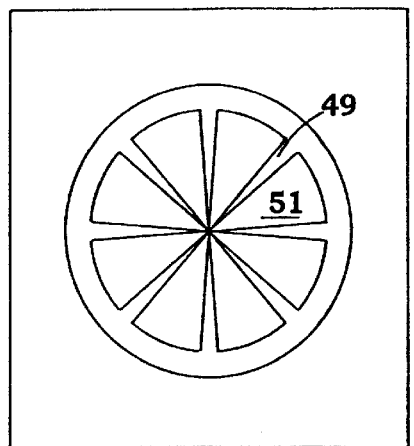
Fig. 5b
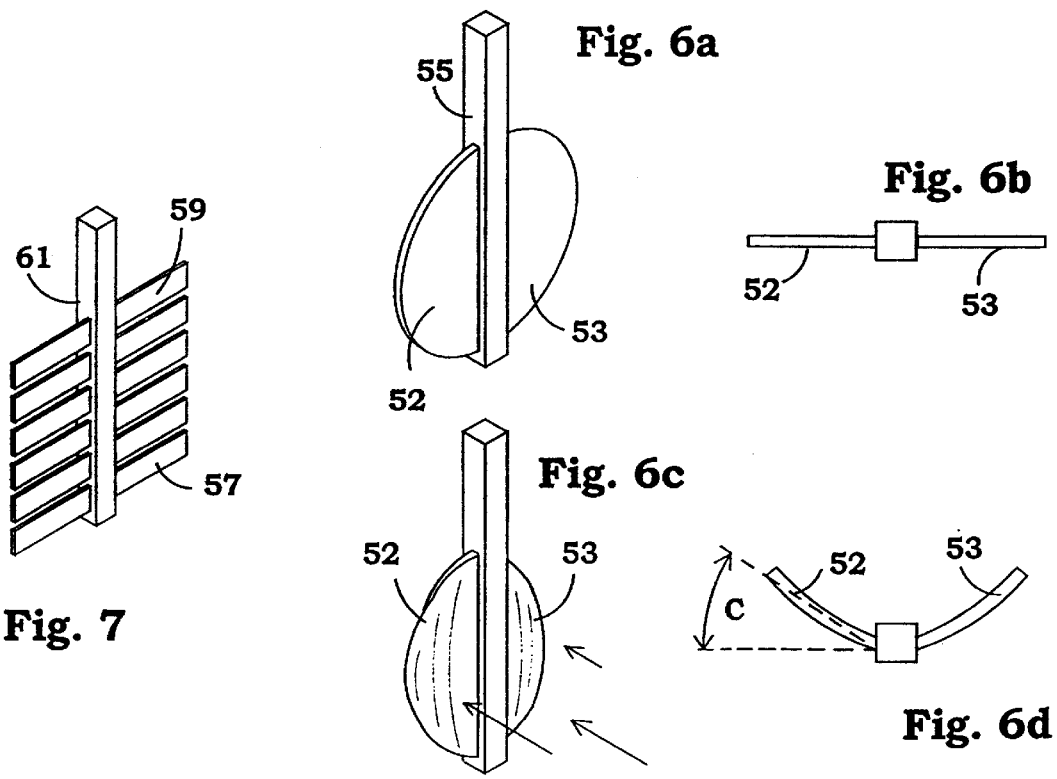

FLOW SENSOR WITH WIDE DYNAMIC RANGE

BACKGROUND OF THE INVENTION

The present invention relates generally to methods and apparatus for measuring fluid flow in a conduit and more especially to such methods and apparatus requiring operation over a wide range of flow rates.

Current flow sensors for fuel measurement in aircraft engines are both expensive and require frequent replacement. These flow sensors are required to operate on fluid flows varying from no flow, to a few hundred pounds per hour (pph), to 5000 pph or more.

Cantilevered beam flow meters are known and provide adequate measures of fluid flow in many applications, however, the prior art designs are often inadequate for applications having a wide range of fluid flow rates. The force applied on the cantilever beam is governed by: the area of the beam exposed to the flow; the drag coefficient which is determined by the sensor and the pipe geometries as well and the flow characteristics; specific gravity of the fluid being measured; and the square of the flow velocity. Because of this square relationship, the drag force on the beam is far greater at high flows compared to low flows. As noted earlier, in typical aircraft applications the operating fluid flow can vary from a few tens of pounds per hour (pph), for example, during descent or idle operation to thousands pph or more, for example, during take-off. The cantilever beam, therefore, has to be designed to operate and survive the high flow which results in a very large drag force. Moreover, the sensitivity of the device is as important at the low flows (very small drag force) as well as high flows (unproportionately large drag force).

It is desirable to provide a flow sensor exhibiting a reduced likelihood of damage at high flow rates and enhanced sensitivity at low flow rates. It is also desirable to provide a highly reliable flow sensor at low cost.

The present invention provides solutions to the above problems by providing a cantilever beam sensor in which the drag area of the beam decreases as the flow increases. This allows the flow meter to operate accurately both at low and high flows (high turndown ratio). The present invention further provides a flow sensor based on thick film technology with a wide dynamic range.

In accordance with one form the invention, the dynamic range of a fluid flow sensing device of the type that provides a measure of fluid flow based on the force the flowing fluid exerts on a surface of a sensor member exposed to that fluid flow, is enhanced by reducing the effective area of the sensor member surface which is exposed to the fluid flow as the fluid flow rate increases, and increasing the effective area of the sensor member surface which is exposed to the fluid flow as the fluid flow rate decreases. The effective area may be increased and decreased by changing the angle between the surface and the direction of fluid flow, or it may be increased by inserting an additional portion of the sensor member into the fluid flow, and decreased by Withdrawing a portion of the sensor member from the fluid flow. Both techniques are utilized in a preferred embodiment. In accordance with is another aspect of the invention, a fluid flow measuring device includes a conduit through which fluid may flow and a cantilevered beam having a free end portion thereof extending obliquely into the conduit to be deflected by the flow of fluid in the conduit. There is an arrangement which provides an indication of the amount of beam deflection and converts the indicated amount of beam deflection into a measure of the fluid flow rate. There may be a recess in the conduit forming a region of substantially reduced fluid flow and an end of the cantilevered beam which is opposite the free end is fixed within the recess. As beam deflection increases in response to increasing fluid flow, the portion of the beam within the recess increases and the portion of the beam exposed to the fluid flow decreases thereby providing enhanced flow sensitivity at lower flow rates and a measuring device of enhanced dynamic range. The present invention comprises a fluid flow measuring device comprising a conduit through which fluid may flow; a cantilevered beam having a free end portion thereof extending obliquely into the conduit to be deflected by the flow of fluid in the conduit; means responsive to beam deflection for providing an indication of the amount of beam deflection; and means for converting the indicated amount of beam deflection into a measure of the fluid flow rate.

BRIEF DESCRIPTION OF THE DRAWINGS

FIG. 3a is a schematic sectional side view along lines a—a of FIG. 3c illustrating a cantilevered beam sensor flow meter according to the present invention;

FIG. 3b is a schematic sectional side view along lines b—b of FIG. 3d of the cantilevered beam flow sensor under nearly full flow conditions;

FIG. 3c is a right side view of the sensor of FIG. 3a;

FIG. 3d is a right side view of the sensor of FIG. 3b;

FIG. 3e is a cross-sectional view similar to FIG. 3a, but illustrating the cantilevered beam flow meter in greater detail;

FIGS. 4a and 4b are plan views of an apertured flow meter sensor;

FIGS. 5a and 5b are plan views of another apertured flow meter sensor;

FIG. 6a is an isometric view of a flow meter sensor having cantilevered resilient vanes under no flow conditions;

FIG. 6b is a top view of the sensor of FIG. 6a;

FIG. 6c is an isometric view of the flow meter sensor of FIG. 6a with the vanes responding to fluid flow;

FIG. 6d is a top view of the sensor of FIG. 6b; and

FIG. 7 is an isometric view of a flow meter sensor having multiple cantilevered resilient vanes under no flow conditions.

Corresponding reference characters indicate corresponding parts throughout the several views of the drawing.

DETAILED DESCRIPTION OF THE INVENTION

Figure 1A:
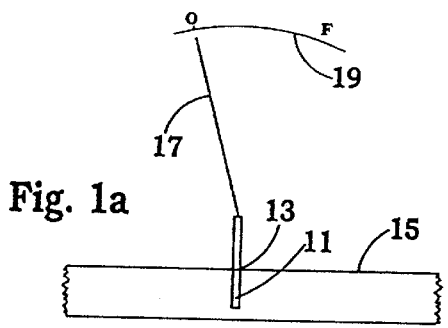
FIGS. 1a–1d are schematic illustrations of a flow meter at various low rates exhibiting nonlinear response characteristics.
Figure 1B:
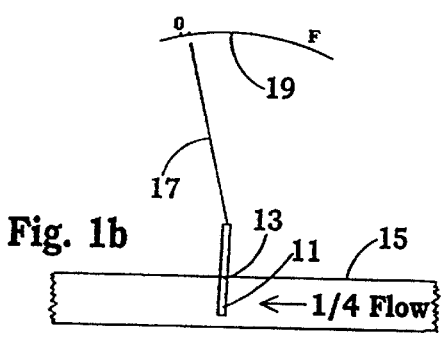
Figure 1C:
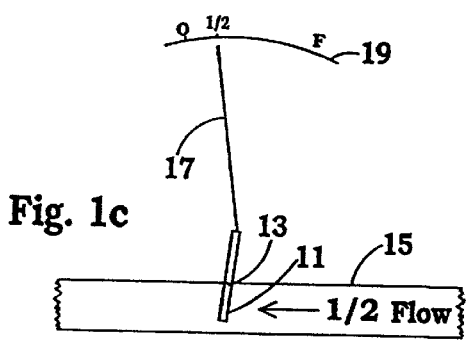
Figure 1D:
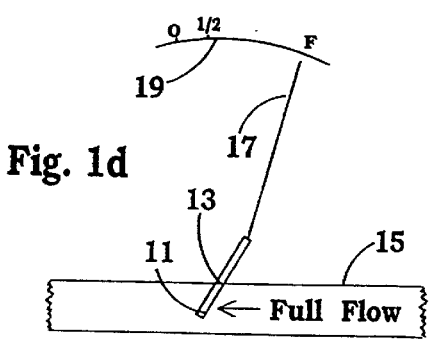

In FIG. 1, a sensor element 11 is pivotally connected at 13 to conduit 15. As fluid flows through the conduit 15 from right to left, the fluid exerts a force on the sensor element 11 causing it to pivot clockwise against a spiral spring or other bias (not shown). The sensor element 11 rigidly supports a cursor 17 which points to the current rate of fluid flow on dial 19. The dial is calibrated generically from no-flow as in FIG. 1a to full-flow as in FIG. 1d. Recall, the force on the element 11 is proportional to the square of the fluid velocity. Thus, at ¼ flow rate, the cursor has moved only ¹⁄₁₆ of the way from zero to full-flow as shown in FIG. 1b. For ⅛ of full flow, the cursor would have moved only ¹⁄₆₄ of the distance from zero to full-flow which would be almost imperceptible. The fluid flow metering device of FIG. 1 exhibits very poor sensitivity at low flow rates.

Figure 2A:
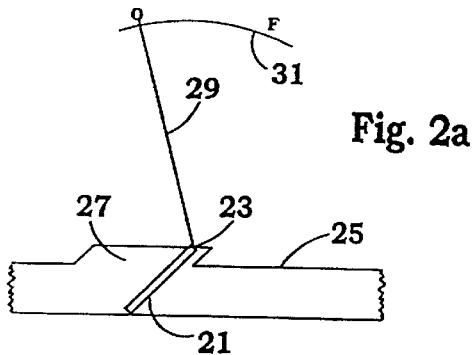
FIGS. 2a–2d are schematic illustrations of a flow meter according to the present invention at various flow rates exhibiting substantially linear response characteristics.
Figure 2B:
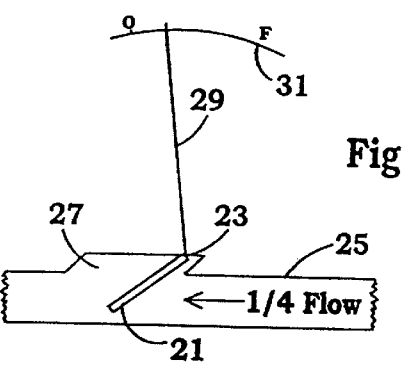
Figure 2C:
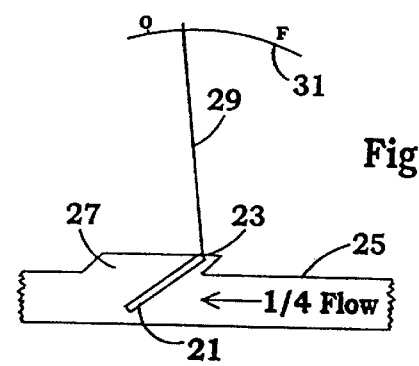
Figure 2D:
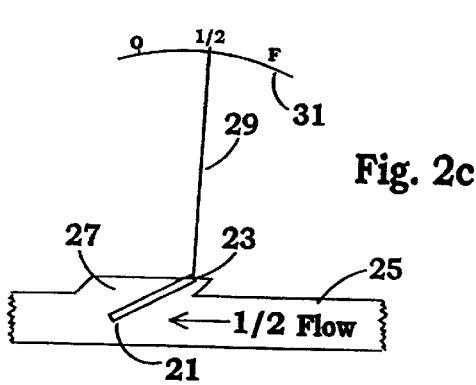

FIG. 2 illustrates a modification to enhance low flow rate sensitivity. The sensor element 21 pivots at 23 and is rigidly connected to cursor 29. Fluid flow is again from right to left through the conduit 25. There are two important differences between FIGS. 1 and 2. The sensor element 21 is initially inclined at an oblique angle to the direction of fluid flow. The pivot location for the sensor element 21 is located a significant distance away from the fluid flow in a pocket or recess 27. The advantages of this configuration are two-fold. As the flow increases, the angle at which the sensor element 21 faces the flow increases. This reduces the effective area of the sensor element—the area of the sensor element perpendicular to the direction of flow thus reducing the overall force exerted on the element by the flowing fluid. This reduction changes the nonlinear (approximately second degree polynomial) response characteristics of FIG. 1 to the more nearly linear response characteristics of FIG. 2.

In FIG. 3, fluid flow is through the conduit 33 from right to left along the axis 36. A cantilevered beam sensor 37 is fixed at 39 and extends into the flow at an oblique angle A to the direction of fluid flow. Note, the angle between the beam surface and a vertical line (FIG. 3a) is the same as the angle between a normal to the surface of the beam and the direction of fluid flow (FIG. 3e). As fluid flow increases, the beam 37 experiences increasing deflection as illustrated in FIGS. 3b and 3d. The effects of this deflection are two-fold. A portion of the beam surface area moves out of the main flow of fluid and retreats into the low flow region of the pocket or recess 35. Thus, the beam area which is subjected to the force of the fluid flow is reduced. Moreover, the angle between the beam and the direction of fluid flow increases by the angle B. Since the force on the beam 37 is proportional to the projected or normal component of surface area, the force is proportional to cos (A+B) times the actual surface area exposed to the flow. The projected or effective surface area of beam 37 at no flow is seen within the circular conduit 33 in FIG. 3c while the effective or projected surface area of beam 37 at a significant flow rate is seen within the circular conduit 33 in FIG. 3d. For this particular illustration, the area is reduced to about ⅓ of its no flow value. Beam deflection may be translated electronically into an indication of flow rate as indicated in FIG. 3e.

In FIG. 3e, strain responsive coatings 63 and 65 are disposed on opposite sides of the beam 37. These coatings may, for example, be variable resistance ceramic coatings as disclosed in U.S. Pat. Nos. 4,794,048 and 4,997,698 and provide an indication of the amount of beam deflection. These variable resistance coatings 63 and 65 are connected by twin conductor leads 69 and 71 to a conversion circuit, for example, a resistance bridge circuit 73 with the layers comprising two legs of the bridge. Circuit 73 provides a measure or indication of the fluid flow rate. Piezoelectric or variable capacitance layers may also be used.

The sensor portion exposed to the flow to be measured may be the simple beam as thus far discussed, or may be a somewhat larger beam supported paddle. Since the response of a paddle type flow sensor is proportional to the area of the paddle, the sensitivity of such a sensor to low flow rates can be enhanced if the paddle area is larger at low flow rates than at high flow rates. FIG. 4a shows a paddle section 41 which is to be acted upon by fluid flow. A series of radial slots such as 43 define therebetween a series of pie-shaped segments such as 45. As the fluid flow (which is normal to the plane of the drawing) increases, these pie-shaped segments bend outwardly with the flow opening a central aperture as shown in FIG. 4b thereby reducing the effective area of the paddle. The number of pie-shaped segments as well as the number of whole pies on a paddle are determined by the particular application.

FIG. 5a similarly illustrates a paddle section 47 which is to be acted upon by fluid flow. Again, a series of radial slots such as 49 define therebetween a series of pie-shaped segments such as 51. While the pie-shaped segments of FIGS. 4a and 4b were fixed to the paddle along their outer edges (the pie crust), the segments of FIGS. 5a and 5b are joined and supported at the center. As the fluid flow (again normal to the plane of the drawing) increases, these pie-shaped segments bend outwardly with the flow opening an annulus as shown in FIG. 5b thereby reducing the effective area of the paddle.

As shown in FIGS. 6a–d, making the effective sensor area larger at low flow rates than at high flow rates can be accomplished with paddle sections or vanes 52 and 53 which elastically bend back at high flow rates. These vanes are supported on a beam 55 which may flex with that flexure monitored by some type of strain gauge, or the beam may be relatively inflexible and its pivotal motion in response to fluid flow monitored. As the flow indicated by the arrows in FIG. 6c increases, the vanes yield as best seen in FIG. 6d reducing the flow responsive effective area. The effective area of this bendable section is proportional to the product of its area and the cosine of the bend angle C.

FIG. 7 illustrates a variation on the concept of FIGS. 6a–6d having a multitude of separate vanes such as 57 and 59 supported on a common beam 61. The vanes 57 and 59 yield to increasing flow in a manner similar to the vanes 52 and 53 of FIG. 6c.

What is claimed is:

1. A method of extending the dynamic range of a fluid flow sensing device providing a measure of fluid flow based on the force flowing fluid exerts on a surface of a cantilevered beam sensor member mounted within a region of substantially reduced fluid flow and having a free end exposed to and deflected by the fluid flow, comprising reducing the effective area of the sensor member surface at the free end which is exposed to the fluid flow by increasing the sensor member surface area located within the region of substantially reduced fluid flow as the fluid flow rate increases, and increasing the effective area of the sensor member surface which is exposed to the fluid flow by decreasing the sensor member surface area located within the region of substantially reduced fluid flow as the fluid flow rate decreases.

2. The method of claim 1, wherein the effective area is increased and decreased by changing the angle between the surface and the direction of fluid flow.

3. The method of claim 1, wherein the surface of the cantilevered beam sensor member comprises a substantially planar surface area of the beam disposed at a substantial oblique angle to the direction of fluid flow when the fluid is static.

4. The method of claim 3, wherein as the flow increases, the beam deflects increasing the oblique angle between the direction of fluid flow and the normal to the surface of the cantilevered beam sensor member thereby further reducing the effective area of the beam surface.

5. A fluid flow measuring device comprising:

a conduit through which fluid flows in a downstream direction;

a cantilevered beam having a free end portion thereof extending into the conduit obliquely in the downstream direction to be deflected in the downstream direction by the flow of fluid in the conduit;

a recess in the conduit forming a region of substantially reduced fluid flow, the cantilevered beam having an end opposite the free end fixed within the recess;

means coupled to the beam and responsive to beam deflection for providing an indication of the amount of beam deflection;

means responsive to the means coupled to the beam for converting the indicated amount of beam deflection into a measure of the fluid flow rate.

6. The fluid flow measuring device of claim 5, wherein, as beam deflection increases in response to increasing fluid flow, a portion of the beam within the recess increases and the portion of the beam exposed to the fluid flow decreases thereby providing enhanced flow sensitivity at lower flow rates and a measuring device of enhanced dynamic range.

7. The fluid flow measuring device of claim 5, wherein the means coupled to the beam comprises two layers of variable resistance ceramic material, and the means for converting comprises a resistance bridge circuit with the two layers comprising two legs of the bridge.

8. The fluid flow measuring device of claim 5 wherein the means comprises at least one strain responsive layer coupled to the beam.

9. The fluid flow measuring device of claim 5, wherein as beam deflection increases in response to increasing fluid flow, a projected component of beam surface area normal to the direction of fluid flow is reduced partially compensating for an increase in force exerted on the beam thereby providing enhanced flow sensitivity at lower flow rates and a measuring device of enhanced dynamic range.

10. A fluid flow measuring device comprising:

a conduit through which fluid flows;

a sensing element, responsive by displacement to the force of the fluid flow, having a portion thereof extending into the conduit to be subjected to the force of the flow of fluid in the conduit, the sensing element portion including a resiliently yieldable region comprising less than the entire sensing element portion and which progressively yields as the fluid flow rate increases to progressively diminish the effective yieldable region subjected to the force of the flowing fluid;

means for providing a measure of the force exerted on the sensing element; and means for converting the force measure into a measure of the fluid rate.

11. The fluid flow measuring device of claim 10, wherein the resiliently yieldable region comprises a variable size aperture in the sensing element portion.

12. The fluid flow measuring device of claim 10, wherein the resiliently yieldable region comprises at least one cantilevered vane extending from the sensing element portion generally orthogonal to a direction of fluid flow.

* * * * *